B. HIRSCHHORN.
TEA CARTRIDGE.
APPLICATION FILED NOV. 9, 1918.

1,310,796.

Patented July 22, 1919.

INVENTOR
B. Hirschhorn
BY
Symmuel Herzog
his ATTORNEY

UNITED STATES PATENT OFFICE.

BENJAMIN HIRSCHHORN, OF NEW YORK, N. Y., ASSIGNOR TO NATIONAL URN BAG MANUFACTURING CO., OF NEW YORK, N. Y., A FIRM.

TEA-CARTRIDGE.

1,310,796.  Specification of Letters Patent.  Patented July 22, 1919.

Application filed November 9, 1918. Serial No. 261,867.

*To all whom it may concern:*

Be it known that I, BENJAMIN HIRSCHHORN, a citizen of the United States and a resident of the city of New York, in the county of New York and State of New York, have invented certain new and useful Improvements in Tea-Cartridges, of which the following is a specification.

The present invention relates to a cartridge for percolating or extracting the flavor from tea leaves or coffee.

Cartridges of this type usually comprise a closed receptacle, containing a definite quantity of tea leaves or coffee, just sufficient for a single brewing, the exhausted tea leaves or coffee being wholly withdrawn from the brewing pot after the brewing operation is completed. One type of these cartridges is made in the form of a perforated metallic container, and has been found objectionable because the hot water coming into contact therewith, while the infusion is being performed, acquires a "metallic" taste.

The main object of the present invention is to provide a cartridge that is made up of an open-mesh fabric, such as cotton, to overcome the objection above-mentioned, and to provide a closure for the container that is simple in construction, efficient in operation and which can be conveniently applied to the container.

Another object of the invention is to so construct the cartridge that, in assembling the elements thereof, a, preferably, flexible suspending means is secured thereto by the closure thereof.

A further object of the invention is to provide a cartridge of the character described which can be manufactured on a commercial scale, or in other words one which is not so difficult to produce as to be beyond the reasonable cost of such a contrivance.

With these and other objects in view which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

A few of the many possible embodiments of the invention are illustrated in the accompanying drawings, in which:—

Figure 1:
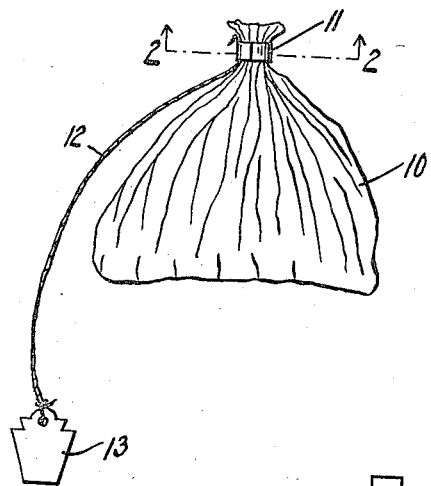
Figure 2:
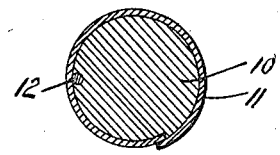
Figure 3:
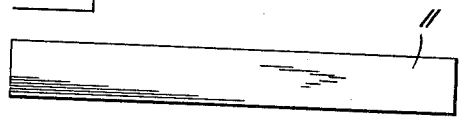
Figure 4:
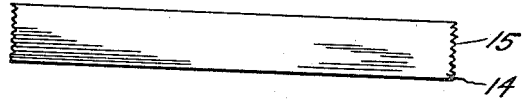
Figure 5:
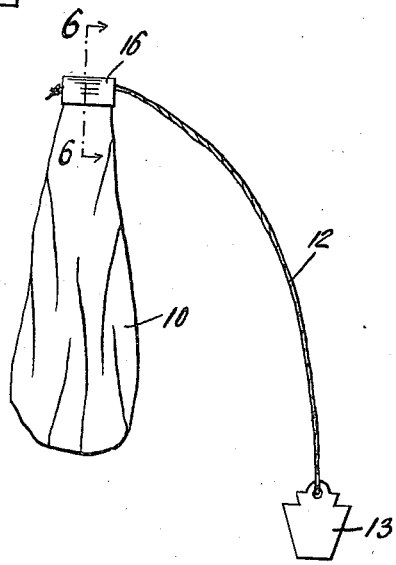
Figure 6:
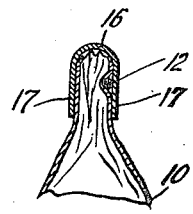

Figure 1 is an elevation of a completed tea cartridge constructed in accordance with the present invention; Fig. 2 is a section taken on line 2—2 of Fig. 1, on a larger scale; Fig. 3 is a plan view of the cartridge closure in its developed state; Fig. 4 is a similar view of a modified closure; Fig. 5 is an elevation of a further modification of the invention; and Fig. 6 is a section taken on line 6—6 of Fig. 5, on a larger scale.

Referring now first to Figs. 1 to 3, inclusive, of the drawings, the numeral 10 indicates a bag of open-mesh textile fabric, such as for instance cotton, and of a size to contain just sufficient tea leaves or coffee for a single brewing. This bag may be produced in any suitable manner, the tea-leaves or coffee being placed thereinto after it has been properly sterilized. The mouth of the bag is closed by drawing or gathering the same into folds, and applying thereto a metallic strip 11, that is shaped to assume the form of a ring, embracing the folded portion of the bag below its mouth, thereby holding the folds under compression, so as to prevent escaping of the contents. The strip 11 must, obviously, be made of a non-corroding metal or of a metal that is properly prepared to prevent corrosion, and is, preferably, sterilized before it is applied to the bag. For the purpose of facilitating the handling of the cartridge, there is secured thereto a flexible means, such as a string 12, to which is attached at its free end a handle 13, that is made, for instance, of cardboard. This string serves also as the means for suspending the cartridge from the receptacle, such as a tea-pot or coffee-pot, in which the extraction is to take place. The string is secured to the cartridge by placing it against the folds around the bag mouth before the strip 11 is formed, to constitute a ring-shaped closing means for the bag. The strip 11 thus has a two-fold purpose, to wit: First, it serves as a bag closure, and, second, it constitutes the means for attaching the handle carrying string to the bag.

In brewing tea or coffee with the improved device, the cartridge is taken hold of by its handle 13 and lowered into a tea-brewing receptacle, the free end of the string and handle being permitted to hang over the mouth of the receptacle, after which its cover is put in place. The cover will thus hold the outer end of the string and handle ready for further operation. Into the receptacle is poured a suitable quantity of boiling water, either before or after the insertion of the cartridge. When sufficient essence has been extracted from the tea leaves or coffee within the cartridge, the cover of the brewing receptacle is removed from the pot and the bag withdrawn by grasping its handle 13.

The cartridge made in accordance with this invention forms a convenient package for the transportation and use of the substance contained therein, and as such may be an article of merchandise.

In Fig. 4 of the drawings, a metallic strip 14 is shown, that is provided along its transverse edges with serrations 15, to form teeth. When this strip is used, instead of the strip 11 above referred to, the teeth are caused to pierce the bag material, when the strip is shaped to form a closure ring. The closure has thus a better grip on the bag.

A further modification of the invention is illustrated in Figs. 5 and 6 of the drawings, differing from those above-described in that the bag 10 is closed by a cap 16, made of metal of the character above described and consisting of a strip, that is substantially U-shaped and embraces the mouth of the bag. In applying this closure, the bag mouth is drawn into folds and the closure secured thereto by pressing its leg portions 17 toward one another, thereby compressing the folds and securely sealing the bag mouth. The string 12 and handle 13 are fixed to the bag in the manner described in connection with Figs. 1 and 2 of the drawings, so that the cap 16 has also the two-fold purpose of the closure above described.

It is obvious that, while in connection with Figs. 5 and 6 of the drawings a specific cap has been described, others may just as well be used without departing from the invention, the main feature of which is that the closures seal the mouth of the bag by compressing or gripping the folds, into which the mouth portion of the same is drawn. Attention is also called to the fact that, while herein the closures have been described as being made of metal, they may be made of other suitable materials without departing from the invention.

It should also be noted that, while the closures have been described as being made of flat strips, they may be made of strips of other cross-sections, such as for instance wires as far as the devices shown in Figs. 1 to 4, are concerned.

What I claim is:—

1. A device for extracting essence from tea-leaves or coffee, comprising a bag of textitle fabric having its mouth drawn into folds, a metal strip engaging and compressing said folds for closing the mouth of said bag, and a suspending string attached by said strip to said bag.

2. A device for extracting essence from tea-leaves or coffee, comprising a bag of textile fabric having its mouth drawn into folds, a suspending string abutting with one of its ends against said folds, and a metal strip engaging and compressing said folds for closing the mouth of said bag and for attaching said string thereto.

3. A device for extracting essence from tea leaves or coffee, comprising a bag of textile fabric having its mouth drawn into folds, a suspending string abutting with one of its ends against said folds, and a metal strip of a cross-section flat throughout its length encircling and compressing said folds for closing the mouth of said bag and for attaching said string thereto.

Signed at New York, in the county of New York, and State of New York, this 24th day of October, A. D. 1918.

BENJAMIN HIRSCHHORN.